Nov. 21, 1961

H. M. STRAUBE 3,010,079

TRANSISTOR BRIDGE MODULATOR

Filed Feb. 19, 1958

INVENTOR
H. M. STRAUBE
BY Walter M. Hill
ATTORNEY

United States Patent Office 3,010,079

Patented Nov. 21, 1961

3,010,079

TRANSISTOR BRIDGE MODULATOR

Harold M. Straube, Mendham, N.J., assignor to Bell Telephone Laboratories, Incorporated, New York, N.Y., a corporation of New York Filed Feb. 19, 1958, Ser. No. 716,167
2 Claims. (Cl. 332—47)

Figure 1:
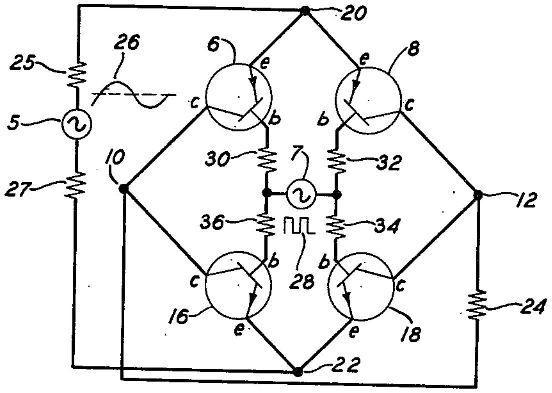

This invention relates to signal modulators and more particularly, in an important aspect, to bridge-type signal modulators.

In the prior art, many bridge network modulating systems have been employed. In these systems a modulating signal is coupled to one of two conjugate pairs of bridge terminals and a load impedance is coupled to the other. The bridge is alternately unbalanced in opposite directions in dependence upon a carrier signal. Double side band modulation is thereby attained.

Semiconductor devices, including the three-electrode transistor, have been employed in such bridge networks for reducing the required carrier, or control, power. Such employment has, however, involved several difficulties. One difficulty arises from the fact that substantial resistive elements may be required to avoid impedance mismatch between the bridge and the other system elements. Such resistive elements, of course, are responsible for substantial power losses. The prior art, to avoid these losses, has resorted to transformer couplings. These transformers are, however, expensive and add complexity to the network.

Another difficulty arises from the fact that transistor devices are not ideally perfect switches and tend to produce undesired frequency components in the intermodulation product signal. Ideally, in a refined modulating system, the modulating signal should contain only frequencies corresponding to the sum and difference of the modulating and carrier signal frequencies. This subject has been discussed by R. S. Caruthers in the Bell System Technical Journal for April 1939 beginning at page 315. In the prior art transistor modulating networks the imperfections in the transistor switching action have led to the introduction of carrier signal current to the load impedance.

Accordingly, it is an object of the present invention to simplify the construction of modulating bridge networks having transistor switching elements.

It is a further object of the invention to reduce the power dissipation of such networks.

It is still a further object, in one important aspect of the invention, to refine the product signals derived from an intermodulation process.

These and other objects are achieved in accordance with the invention by the employment of two pairs of opposite conductivity type transistors to form the arms of a modulating bridge network. Thus, by way of example, in an illustrative embodiment of the invention, the emitter to collector internal conduction paths of two pairs of opposite conductivity type transistors are serially connected to form the four arms of a bridge. The two pairs of oppositely disposed terminals at the corners of the bridge circuit thus, of course, form electrically conjugate signal terminal pairs. The load impedance is conductively connected across one of these pairs and a modulating signal source is conductively connected to the other pair. A carrier signal source is conductively coupled to the base electrodes of the four transistors.

The invention will be more clearly understood and other objects, features and advantages thereof will become more apparent during the course of the following detailed description of illustrative embodiments of the invention and from the appended claims.

Figure 2:
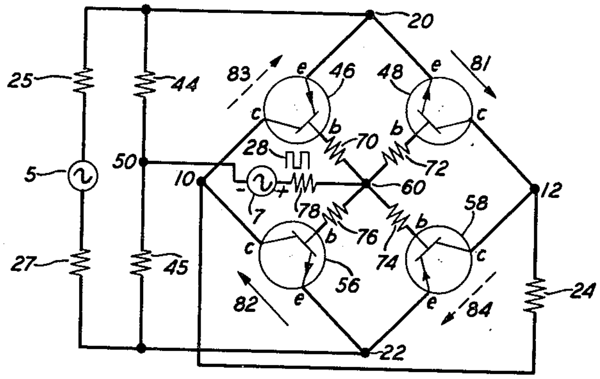

In the accompanying drawings:

FIG. 1 is a schematic diagram of an illustrative embodiment of the invention for providing double balanced modulation between a carrier signal and a modulating signal; and FIG. 2 is a schematic diagram of a second illustrative embodiment of the invention.

Referring in more detail to the drawings, FIG. 1 shows a pair of junction transistors 6 and 8 of one conductivity type, p-type as known in the art. Each transistor has two conduction electrodes, an emitter electrode *e* and a collector electrode *c* and a control, or base, electrode *b*. The internal conduction paths of these transistors, from emitter to collector, are serially connected between a first pair of signal terminals 10 and 12. A second pair of junction transistors, 16 and 18, of an opposite conductivity type, n-type, having emitter and collector conduction electrodes *e* and *c* and a third control, or base, electrode *b*, are likewise serially connected, insofar as their conduction electrodes are concerned, between the same pair of signal terminals 10 and 12. Thus, the internal conduction paths of like conductivity type transistors are adjacently connected in series.

Two signal terminals, 20 and 22, form a second terminal pair electrically conjugate to the pair 10, 12 and are, respectively, connected to the remaining two junctions of the two serially connected transistor internal conduction paths, as shown.

A load impedance, or utilization circuit, which in this illustrative embodiment is represented by the resistor 24, is interconnected between the first pair of signal terminals, 10 and 12. A source 5 of a modulating signal which, by way of typical example, may have a wave form such as that indicated by the symbol 26, is connected, through two balancing resistors 25 and 27 each having a resistance value selected for load impedance matching purposes, between the two terminals 20 and 22 of the second conjugate bridge terminal pair.

The base electrodes of the two opposite conductivity type transistor pairs, i.e., transistors 6 and 16, 8 and 18, are respectively interconnected through the stabilizing resistors 30 and 36, 32 and 34. A source of carrier signals 7 is conductively interconnected between the common-connected base electrodes of these transistor pairs at points lying between the resistors 30 and 36, 32 and 34, respectively. The carrier signal from the source 7 may be of the waveform indicated by the symbol 28 and sohuld have a large amplitude, for example, an amplitude ten times greater than the amplitude of the modulating signal. The resistors 30, 32, 34 and 36 should be large in comparison with the load impedance 24. They should be, for example, ten times as large as the load impedance. This is to prevent control of the conduction state of a transistor by the modulating signal during intervals in which the instantaneous amplitude of the carrier signal is less than that of the modulating signal.

Thus, a four-armed bridge network is formed having the two electrically conjugate signal terminal pairs 10, 12 and 20, 22. In each of the four arms the internal conduction path of a transistor interconnects two of the four bridge terminals. By virtue of the opposite conductivity types of the transistors in opposite arms of this bridge, the transistors in each of the oppositely placed bridge arms are simultaneously rendered conducting or nonconducting in dependence upon the instantaneous polarity of the carrier signal generated by the source 7. That is to say, the two pairs of oppositely placed transistors which make up the bridge are rendered conducting and nonconducting in alternation without need for external biasing potential sources. By way of typical example, transistors 6 and 18 may conduct the modulating signal derived from the source 5 while transistors 8 and 16 are not conducting.

In this fashion the modulating signal is translated through the bridge to the load impedance in an opposite direction with each half cycle of the carrier signal. Hence, double side band modulation is accomplished.

Thus, in this illustrative embodiment of the invention, the carrier signal source, the modulating signal source and the load impedance are directly coupled to the modulating bridge network through simple, direct current, conductive paths. Further, no need exists for circuit complexity to adjust carrier signal polarities for accomplishing proper transistor switching. The negligible impedance of the transistor conduction paths, as is well known in the art, eliminates any need for wasteful dissipation of power within the bridge network itself and only the modulating signal source impedance need be adjusted to match a changing load impedance.

The embodiment of the invention shown in FIG. 2 is closely related to that of FIG. 1. Like elements having like functions are similarly numbered. The embodiment of FIG. 2 differs, however, in that, in this latter illustrated structure, the conduction paths, from emitter to collector, of opposite conductivity type transistors 46, 48, 56, and 58 are serially connected in alternation between the four signal terminals 10, 12, 20, and 22. Thus, in accordance with an important feature of this embodiment of the invention, each transistor of one conductivity type is serially connected between two transistors of an opposite conductivity type and transistors of like conductivity type are disposed in opposite bridge arms. The importance of this feature of this embodiment of the invention is illustrated by the arrows 81, 82, 83, and 84 which are discussed in detail below.

The control, or base, electrodes *b* of all of these four transistors also are connected to a common point 60 through comparable, small resistors 70, 72, 74, and 76. These resistors may have values of the order of a few tens of ohms to account for minor differences in transistor characteristics.

A carrier signal 28, originating from a source 7, like that shown in FIG. 1, is directly interconnected through resistor 78 between the common point 60 and a second point 50 which is balanced through the equal resistors 44 and 45 to one of the two electrically conjugate pairs of signal terminals, 20 and 22. The resistor 78 is substantially equal in resistance value to either resistor 44 or resistor 45. Each of these resistors in turn is very large compared to the resistors 70, 72, 74, 76, say one thousand times as large. Each of the former resistors 44, 45, and 78 is further of large impedance value compared to the impedance value of the load with which the network is to operate. This is for purposes of isolating the carrier signal source 7 from the load and the modulating signal source 5.

A load impedance 24, like that shown in FIG. 1, is interconnected between the other electrically conjugate pair of signal terminals 10 and 12. As the carrier wave 28 is applied between the common-connected base electrodes and the common-connected conduction electrodes of the four transistors, as shown, like conductivity type transistor pairs, each connected in opposite bridge arms, are alternately rendered conducting and nonconducting. Thereby, these transistor pairs alternately provide signal paths in opposite directions through the load impedance 24.

By way of typical example, in the instant when the carrier wave is positive in the direction indicated by the polarity markings adjacent the source 7, the oppositely placed p-type transistors 46 and 58 are driven into a non-conducting state, while the n-type transistors 56 and 48 are placed in a conducting condition. Thus, a complete current path is provided from the modulating signal source 5 through the terminal 20 to the terminal 12, thence through the load impedance 24, to the terminal 10 and through the terminal 22 to the modulating signal source.

Considering this above-discussed conduction condition for illustrative purposes, an important advantage of the invention appears. This bridge, as is the bridge of FIG. 1, is double balanced in accordance with the teachings of Caruthers, cited above. Hence, carrier signal currents, that is, currents arising from the carrier signal source, might be expected to cancel in the load impedance leaving only the desired sum and difference modulation frequencies. Such is not the case in transistor modulators having transistors arranged without regard to conductivity type.

As discussed in my copending application, Serial Number 638,297, filed February 5, 1957, transistors now known fall short of the ideal in performing switching operations. This behavior is considered in detail by J. J. Ebers and J. L. Moll in the Proceedings of the Institute of Radio Engineers, December 1954, pp. 1766, 1767. Thus, under the conditions above recited for the bridge of FIG. 2, the conducting transistors may be considered to act as voltage sources as a result of the signal applied by the carrier signal source 7. These voltages may be considered to arise from the fact that the junctions between the base electrodes and collector electrodes of the transistors 48 and 56 act as forwardly biased diodes for the carrier signal polarity indicated. Hence, distorting voltages in the load impedance are effectively generated by each of the transistors 48 and 56 in accordance with carrier signal variations. The directions of these voltages are as indicated by the solid arrows 81 and 82 respectively. Similarly, the nonconducting transistors 46 and 58 may be considered as constant current sources of a sense as indicated by the dashed arrows 83 and 84 respectively.

As is apparent from inspection of these arrows in FIG. 2, however, by the arrangement of opposite conductivity type transistors in adjacent bridge arms, these undesired carrier signal voltages and currents are opposed with respect to the load impedance 24. Hence, there is in this embodiment of the invention no carrier signal distortion in the load impedance. Thus, pure sum and difference frequency signals result from the intermodulation effected between the carrier signal and modulating signal by the bridge shown in FIG. 2.

It is to be clearly understood that the embodiments of the invention above described are specific illustrative structures in accordance with principles of the invention but that the invention is in no way limited to these specific structures. Numerous and varied other embodiments of the principles of the invention will occur to those skilled in the art. By way of example, two pairs of opposite conductivity type transistors may be connected so that each pair forms opposite arms of a bridge and the base electrodes of each such transistor pair may be connected in common. A carrier signal source may then be connected, in parallel with a modulating signal source, across one pair of the conjugate bridge terminals. Thus, the carrier signal is conductively coupled to the base or control electrodes of the transistor through collector or emitter junctions of the transistors as the case may be. A load impedance may then be conductively coupled across the other pair of terminals thus to complete another modulating system in accordance with principles of the invention.

What is claimed is:

1. A modulating system comprising two transistor switches of a given conductivity type, two transistor switches of an opposite conductivity type, each transistor switch comprising a base control electrode and an emitter to collector internal conduction path, the internal conduction paths of the transistor switches of the given and of the opposite conductivity types being alternately connected in a closed series circuit, thereby forming a bridge network, two pairs of terminals, the terminals of each pair being respectively connected to alternate junctions of the serially connected conduction paths, whereby the two terminal pairs are established in mutually conjugate relation, a load impedance direct-current coupled across one of said terminal pairs, a source of modulating signals coupled across the other of said terminal pairs, and a source of carrier signals direct-current coupled to a common point to which each of said control electrodes is connected by means of a resistor to render oppositely placed transistor switches of opposite conductivity type conducting and non-conducting in alternation.

2. A modulating system comprising two transistor switches of a given conductivity type, two transistor switches of an opposite conductivity type, each transistor switch comprising a base control electrode and an emitter to collector internal conduction path, the internal conduction paths of the transistor switches of the given and of the opposite conductivity types being alternately connected in a closed series circuit, thereby forming a bridge network, two pairs of terminals, the terminals of each pair being respectively connected to alternate junctions of the serially connected conduction paths, whereby the two terminal pairs are established in mutually conjugate relation, a load impedance direct-current coupled across one of said terminal pairs, a source of modulating signals coupled across the other of said terminal pairs, the series combination of two resistors of substantially equal resistance connected across said source of modulating signals, and a source of carrier signals connected between a common point to which each of said control electrodes is connected by means of a resistor and the connection between said resistors of substantially equal value connected across said source of modulating signals to render oppositely placed transistor switches of opposite conductivity type conducting and non-conducting in alternation.

References Cited in the file of this patent

UNITED STATES PATENTS

| | | |
|---|---|---|
| 2,780,725 | Johanson | Feb. 5, 1957 |
| 2,821,639 | Bright et al. | Jan. 28, 1958 |
| 2,827,611 | Beck | Mar. 18, 1958 |
| 2,838,675 | Wanlass | June 10, 1958 |

FOREIGN PATENTS

| | | |
|---|---|---|
| 1,125,813 | France | July 16, 1956 |